United States Patent [19]

Rao et al.

[11] Patent Number: 5,314,142
[45] Date of Patent: May 24, 1994

[54] WING ROOT AEROFOIL FOR FORWARD SWEPT WINGS

[75] Inventors: Alison J. Rao; Francis B. Ogilvie, both of Hatfield, Great Britain

[73] Assignee: British Aerospace Public Limited Company, London, England

[21] Appl. No.: 854,016

[22] Filed: Mar. 18, 1992

[30] Foreign Application Priority Data

Mar. 19, 1991 [GB] United Kingdom ............... 9105767

[51] Int. Cl.$^5$ .................. B64C 21/00; B64C 3/10; B64C 3/44
[52] U.S. Cl. .................... 244/35 A; 244/204
[58] Field of Search ............... 244/35 R, 198, 204, 244/219, 35 A, 45 R, 34 R

[56] References Cited

U.S. PATENT DOCUMENTS

| | | | |
|---|---|---|---|
| 2,628,043 | 2/1951 | Montgomery | 244/35 R |
| 2,709,052 | 5/1955 | Berg | 244/35 R |
| 3,005,496 | 10/1961 | Nichols | 244/207 |
| 3,476,336 | 11/1969 | Hertel | 244/204 |
| 3,635,590 | 1/1972 | Phillips | 416/223 |
| 3,697,193 | 10/1972 | Phillips | 416/223 |
| 4,072,282 | 2/1978 | Fulker et al. | 244/35 R |
| 4,455,003 | 6/1984 | Hilbig | 244/35 R |
| 4,705,240 | 11/1987 | Dixon | 244/199 |
| 4,776,531 | 10/1988 | Noonan | 244/35 R |
| 4,858,852 | 8/1989 | Henne et al. | 244/198 |
| 4,949,919 | 8/1990 | Wajnikonis | 244/35 R |

FOREIGN PATENT DOCUMENTS 2080518 11/1971 France .

OTHER PUBLICATIONS

P. A. Henne, "Inversse Transonic Wing Design Method", Journal of Aircraft, vol. 18, No. 2, Feb. 1981, pp. 121–127.

Primary Examiner—Michael S. Huppert
Assistant Examiner—Virna Lissi Ansley
Attorney, Agent, or Firm—Cushman, Darby & Cushman

[57] ABSTRACT

A swept forward wing for aircraft comprising an inner wing portion and an outer wing portion in which the upper surface curvature of the inner wing portion is designed to create three dimensional flow thereover to manipulate the sweep of the isobars and prevent desweeping thereof, the inner wing portion including a wing root section (4) having a far aft maximum thickness position (14) coupled with high camber in the region of said maximum thickness position, said wing root section (4) further including a negatively cambered leading edge portion (10) and a nose-down twist configured to suppress high leading edge velocities, the combination of thickness and camber forms aft of the leading edge region (10) causing the flow to accelerate until a maximum velocity is reached relatively far back on the wing.

4 Claims, 7 Drawing Sheets

OUTER WING · INNER WING

WING ROOT AEROFOIL FOR FORWARD SWEPT WINGS

BACKGROUND TO THE INVENTION

This invention relates to the design of the inner wing region of a forward swept wing for transonic flight regimes. More particularly it relates to the design of the wing sections towards the wing root which suppresses the tendency of the isobars to desweep over the inner wing, so maintaining shock wave sweep far inboard.

Forward swept wings have some potentially attractive aerodynamic features including a higher geometric sweep at the shock position, 'good' stalling characteristics due to the more highly loaded inner wing, and lower wing root bending moments leading to a lighter wing structure than the 'equivalent' aft swept wing. They do have some disadvantages, not the least of which is the aerodynamic design of the inner wing region. The outer wing design is fairly straight forward and it is not difficult to maintain well swept isobars. Over the inner wing, however, there is a tendency for a very strong, unswept shock to form at high subsonic Mach numbers and at high lift coefficients.

DESCRIPTION OF THE PRIOR ART

Various attempts have been made in the past to control the flow over the inner wing. These include, (i) planform modification to increase the local Doc-:US6432/03/03/92 chord over the inner wing so reducing the loading intensity in this region.

(ii) fuselage shaping to provide a more tolerant boundary for the inner wing flow (iii) using the downwash field generated by lifting foreplane to control the onset flow on the wing.

Although these methods may reduce the strength of the shock wave over the inner wing, it still remains largely unswept. It therefore generates significant amounts of wave drag and, behind the shock, experiences flow breakdown at relatively low lift coefficients compared with wings of equivalent aft sweep.

SUMMARY OF THE INVENTION

It is the object of the present invention to provide an improved aerofoil in which the isobars are forced to remain swept over the inner wing at the design condition, so avoiding the large wave drag penalties due to an unswept shock.

According to one aspect of the present invention there is provided a swept forward wing for aircraft comprising an inner wing portion and an outer wing portion, said inner wing portion including a wing root section having a far aft maximum thickness position coupled with high camber in the region of said maximum thickness position said wing root section further including a negatively cambered leading edge region and a nose-down twist configured to suppress high leading edge velocities;

the combination of thickness and camber forms aft of the leading edge region causing the flow to accelerate until a maximum velocity is reached relatively far back on the aerofoil and whereby steep recompression is alleviated by significant three dimensionality of the flow over the inner wing.

According to a further aspect of the present invention said inner wing portion includes at its intersection with said outer wing portion an aerofoil section of advanced transonic form and the wing root section aerofoil is extrapolated across the inner wing span to the said transonic section and the position and strength of the shock wave is controlled.

BRIEF DESCRIPTION OF THE DRAWINGS

One embodiment of the invention will now be described by way of example and with reference to the accompanying drawings, wherein like numbers designate like portions of the invention and in which.

DETAILED DESCRIPTION OF PREFERRED EMBODIMENT

The basic approach for the design of the inner region of a forward swept wing for transonic flight regimes is outlined below.

Figure 1A:
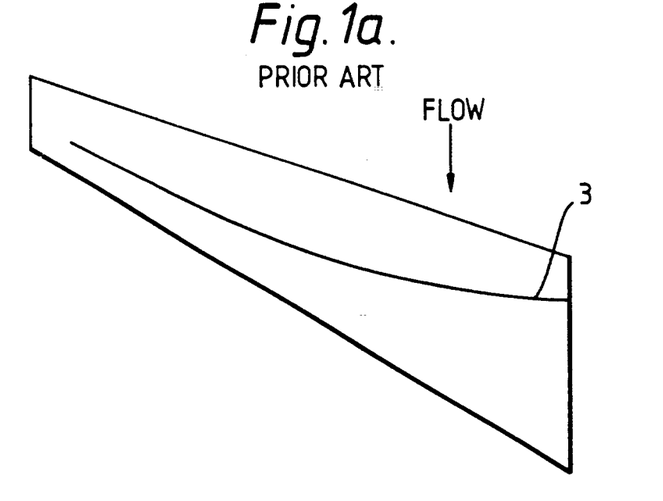
FIGS. 1a, 1b and 1c illustrate the desweeping of the isobars over the inner wing for three typical prior art forward sweep wing designs
Figure 1B:
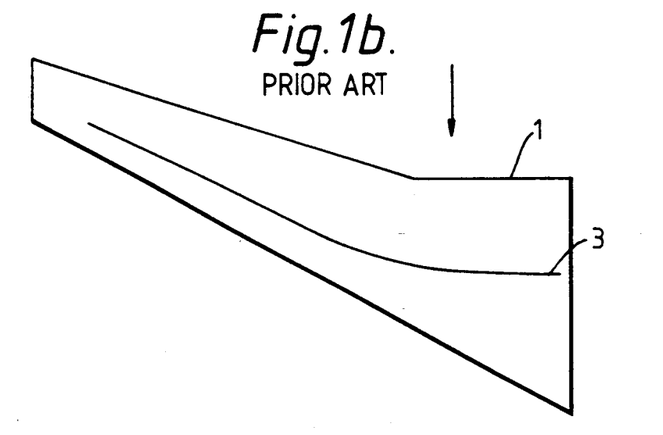
Figure 1C:
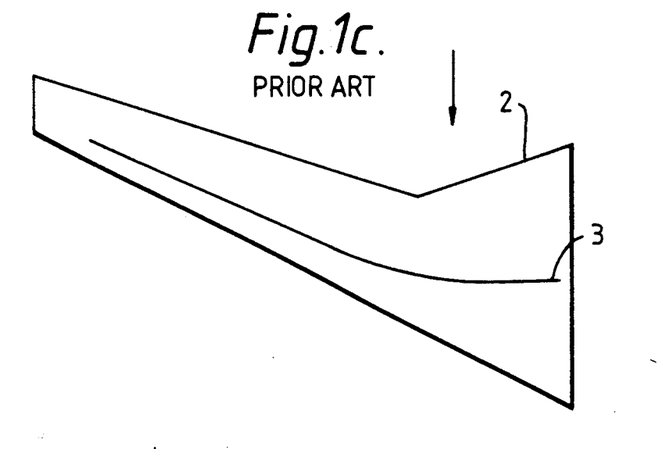

The design of the inner wing poses a problem on a forward swept wing because the isobars tend to desweep towards the wing root (especially when the wing is at a significant incidence). Referring to the drawings this tends to occur irrespective of the wing planform shape as shown in FIGS. 1a, 1b and 1c illustrating respectively a straight-tapered wing, one having an extended leading edge region 1 over the inner wing and one having an aft swept leading edge region 2 over the inner wing. Each indicates the position of the shock wave 3. This is in respect of a wing having a Mach number = 0.78 and a typical thickness/chord = 12.8%.

Figure 2:
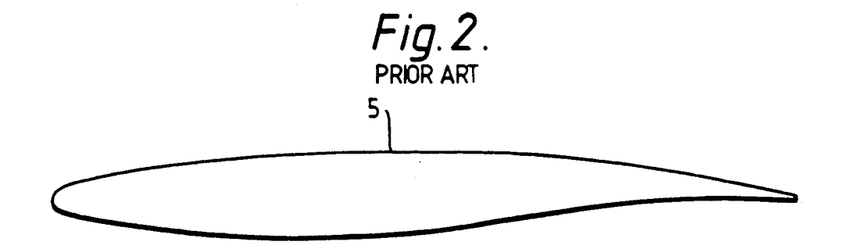
FIG. 2 illustrates the more conventional advanced transonic aerofoil section of well known prior art form used over the outer wing
Figure 3:
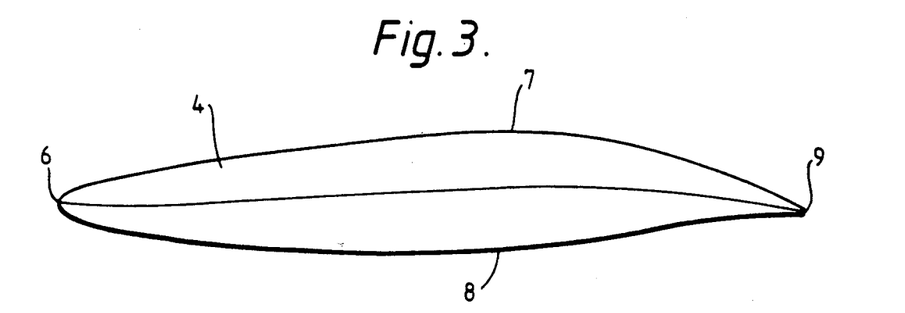
FIGS. 3 and 4 are views of the wing root section geometry according to the invention FIG. 5a, 5b and 5d, 5c respectively illustrate graphically the thickness form, camber form and upper surface curvature distribution of the wing root section geometry of the present invention
Figure 4:
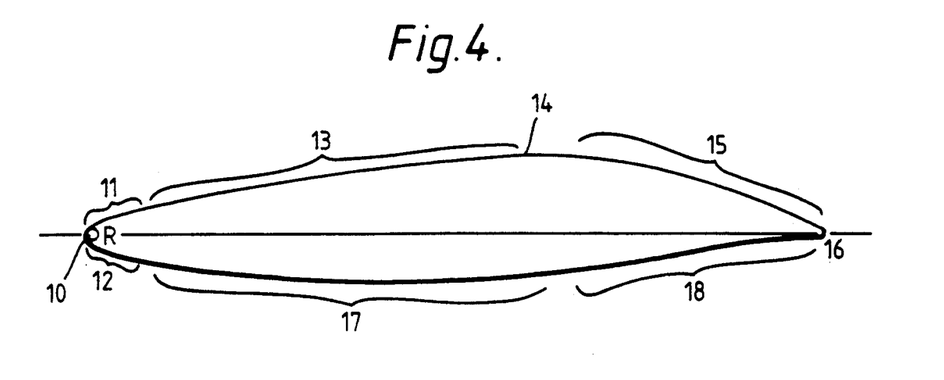

The approach outlined by this invention is to use the geometry of the sections towards the wing root to control the flow over the inner wing. As shown in FIGS. 3 and 4, this requires a radical change in the section geometry of the wing root 4 compared with the typical advanced transonic aerofoil section geometry 5 employed over the outboard wing shown in FIG. 2. Across the inner wing there is an interpolation between the two sections 4 and 5.

In FIG. 3 the wing root section 4 is depicted as comprising a leading edge 6, an upper surface 7, a lower surface 8 and a trailing edge 9.

Figure 5A:
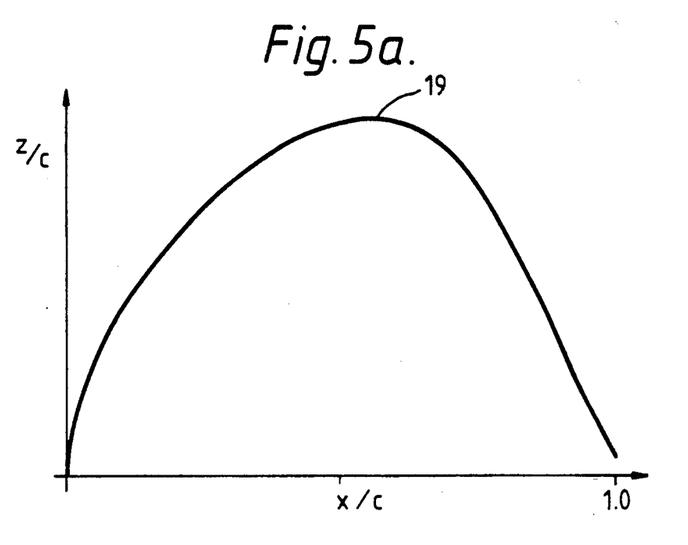
Figure 5B:
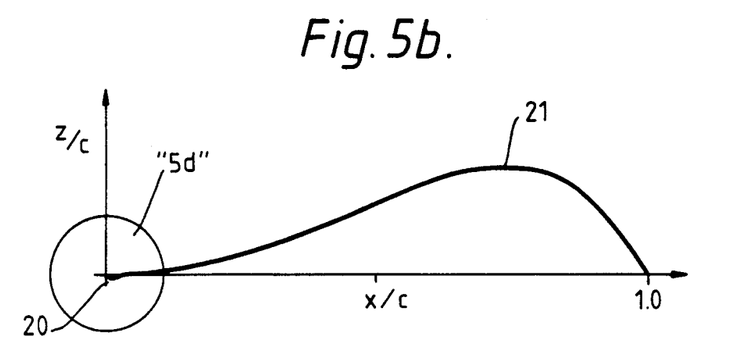
Figure 5C:
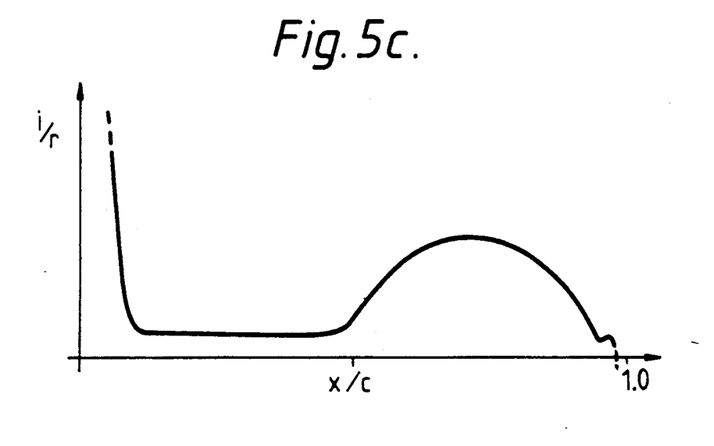
Figure 5D:
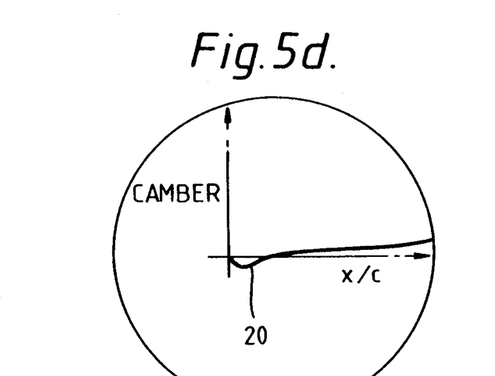

In FIG. 4 the section 4 is shown with a leading edge 10 with a fairly small radius of curvature R. This is blended rapidly into the upper surface 11 and to the lower surface 12 where the curvature is larger and there is a considerable lower surface "thickness," i.e.: the lower surface is a considerable distance from the chord line. The upper surface region 13 aft of the leading edge has a large radius of surface curvature with curvature increasing towards a maximum position at 14. The region 15 aft of this point has a gradually reducing curvature to the trailing edge 16. The design of the lower surface 17 is less critical and could include a reflexed region 18 at the rear of the lower surface. An example of the type of thickness and camber form for the wing root section is illustrated respectively in FIGS. 5a and 5b. The maximum thickness 19 is far aft on the section (typically aft of 50% of the chord). The camber form of FIGS. 5b and 5d show the negative camber 20 at the leading edge increasing to a maximum 21 far aft, on the section. The combination of these features produces the required upper surface curvature conditions to control the flow over the section as illustrated in FIG. 5c.

Figure 6:
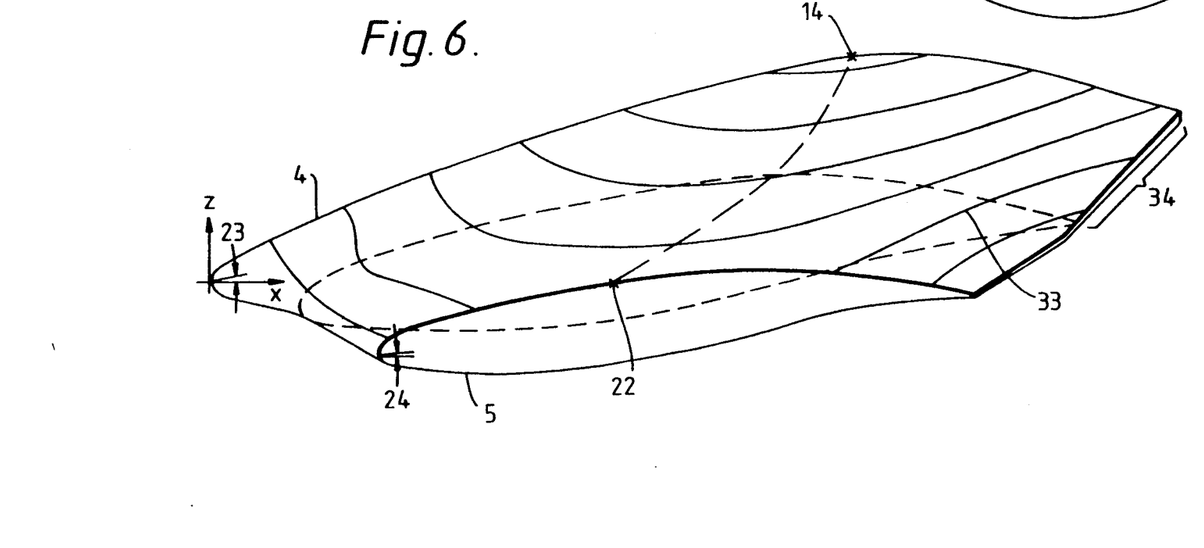
FIG. 6 shows the distribution of the position of maximum sectional thickness over the inner wing FIG. 7a details the isobar distribution over the modified section geometry of the inner wing
Figure 6A:
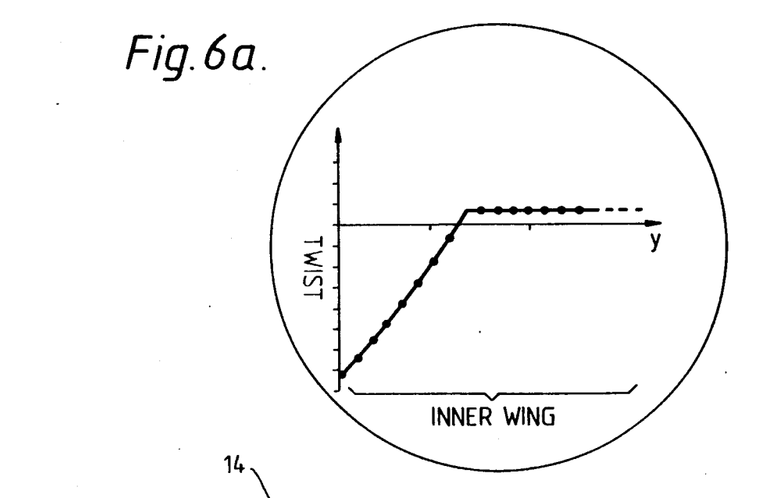
FIG. 6a shows graphically leading edge twist variation across the span.

FIG. 6 shows the variation in inner wing thickness by means of contours 33 which indicate distance from a wing axis system where the x axis is parallel to a fuselage centre line. To form the inner wing design the wing root section 4 is twisted nose down as also shown in FIG. 6a and then interpolated across the span to the section geometry 5 required for the outer wing. This involves the gradual 'pulling forward' of the maximum thickness position 14 of the root section 4 to match the maximum thickness position 22 of the outboard wing section. The nose down twist 23 of the root section 4 is also reduced fairly rapidly to match the twist 24 of the outboard sections 5. The rapid change in section twist at the trailing edge of the inner wing is shown in the region 34.

Figure 7A:
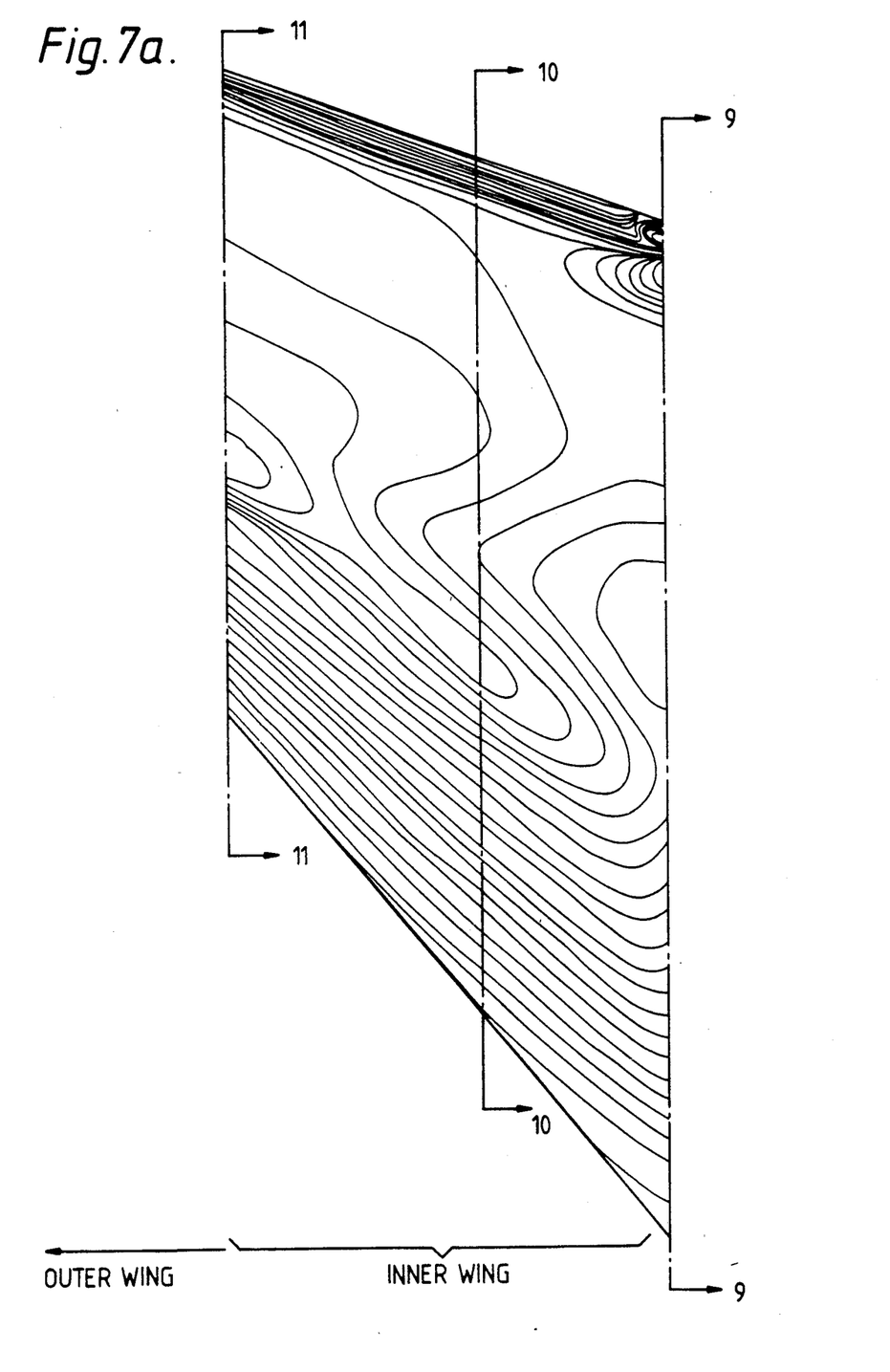
Figure 7B:
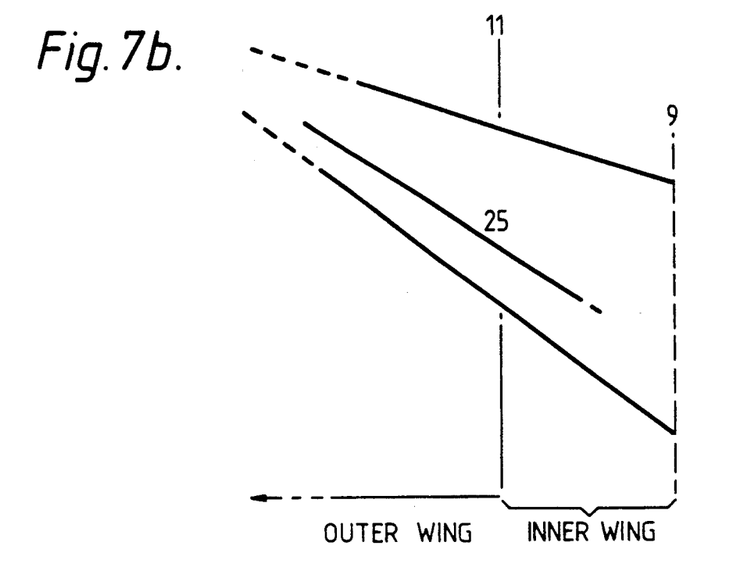
FIG. 7b illustrates the position of the shock wave at high transonic Mach numbers.
Figure 8:
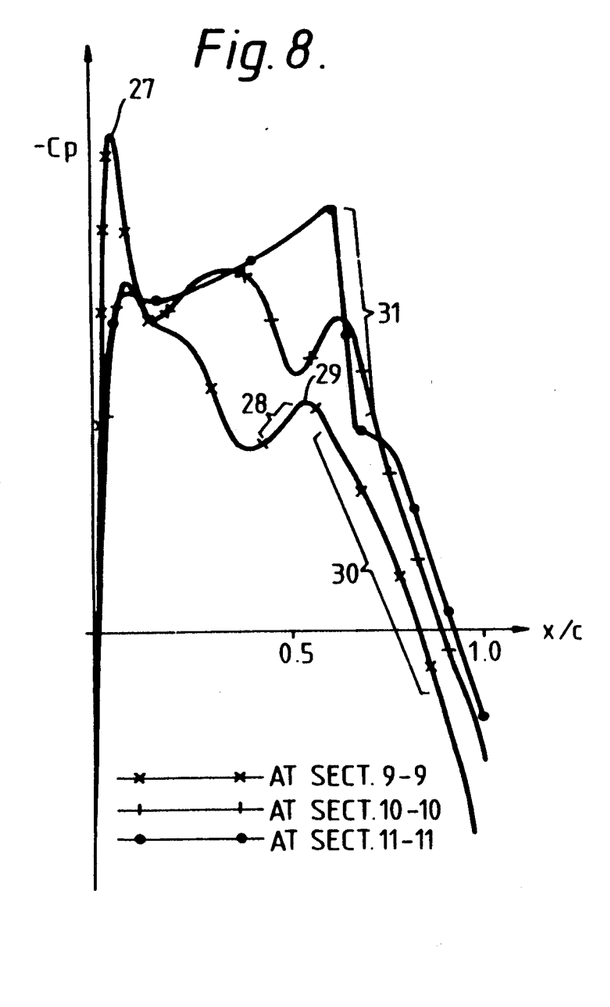
FIG. 8 compares the pressure coefficient distribution over the upper surface of the inner wing at 3 spanwise stations; very close to the wing root, a typical outboard section and an intermediate section
Figure 9:
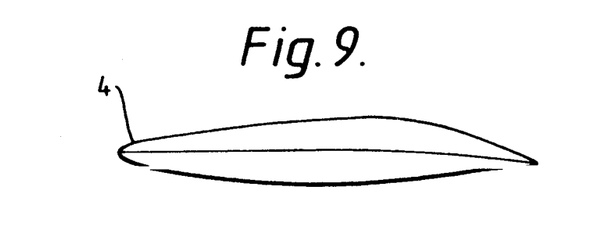
FIGS. 9, 10 and 11 illustrate respectively the three spanwise sections viewed in direction of arrows 9—9, 10—10 and 11—11 in FIG. 7a FIGS. 12 and 13 illustrate the alternative ways in which the required inner wing geometry can be achieved.
Figure 10:
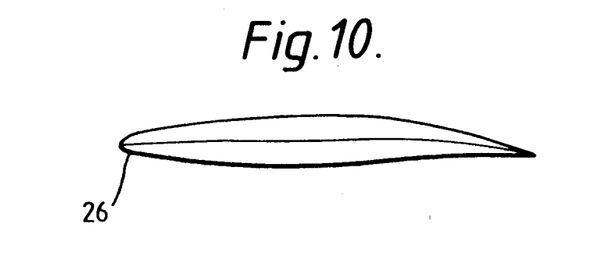
Figure 11:
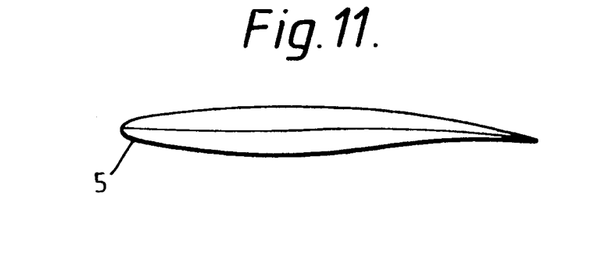

The isobar distribution over this inner wing is shown in FIG. 7a. The geometry of the wing root section modifies the flow over the inner wing, forcing the isobars to remain swept far inboard. At high transonic Mach numbers this means the shock wave 25 over the wing also remains swept inboard as shown in FIG. 7b. Typical upper surface chordwise pressure coefficient distributions at three spanwise positions over the inner wing are shown in FIG. 8. Sample distributions are detailed for a section at the wing root section 4 (FIG. 9), a typical outboard wing section 5 (FIG. 11), and an intermediate inner wing section 26 (FIG. 10). The pressure distribution over the upper surface of the wing root section shows that the negatively cambered leading edge region, coupled with the overall nose down twist of the section is effective in minimising the large leading edge peak velocities 27. The gradual increase in upper surfaces curvature across the wing root section forces the flow 28 to accelerate until a maximum in curvature is reached and the local flow 29 velocity becomes a maximum also. This is followed by a recompression 30 to the trailing edge. This recompression is mild compared to that expected by looking at the two-dimensional geometry of the root section, and it is the strongly three-dimensional nature of the flow over the inner wing regions which allows the use of these extreme section geometries. The pressure distribution over the typical outboard section shows the shock wave 31 aft on the section. This form of pressure distribution extends over a large proportion of the outboard wing producing a well swept isobar pattern. The pressure distribution over the intermediate section ranges between the two, the leading edge peak reducing and the amount of supercritical flow aft of the leading edge increasing for progressively more outboard sections.

The operation of the present invention is now believed apparent. To achieve the desired characteristic of well swept isobars over the inner wing region of a forward swept wing, the flow over the wing root region must be controlled by using novel section geometries.

At the root of a straight, planar, forward swept wing there is a tendency for a large peak in local velocity to develop close to the leading edge of the section (as was seen in FIG. 1a). This dominates the flow over the inner wing, pulling the isobar pattern forward on the sections. By a combination of negative camber over the leading edge region and the overall nose down twist over the inner wing these local velocities can be suppressed. Reducing the severity of the leading edge velocity peak alone is not sufficient to introduce any significant sweep to the isobars. This invention therefore performs a second function by using the geometric shaping of the inner wing aft of the leading edge sections (particularly the curvature of the upper surface and the thickness distribution) to accelerate the flow at the wing root to a maximum aft on the section. Having forced this characteristic at the wing root section, the intermediate sections over the inner wing, by gradually moving the maximum thickness position forward on the chord to match that of the outboard wing, also encourages the flow to accelerate aft on the sections. This creates the well swept isobar pattern over the outboard wing to be 'carried over' onto the inner wing region.

The third feature of this inner wing design is the exploitation of the three-dimensional nature of the flow to alleviate the steep pressure recovery over the rear inner wing sections. This means that the 'extreme' geometries of the sections close to the wing root can be tolerated by the three-dimensional wing flow because the flow direction over the aft position of the inner wing is far from chordwise.

The inner wing design resulting from this approach can be thicker than present forward swept wing designs especially around the 70% chord position. This facilitates the incorporation of trailing edge high lift systems as well as generally increasing the volume within the sections, potentially increasing the fuel volume and leading to a lighter wing structure.

Figure 12:
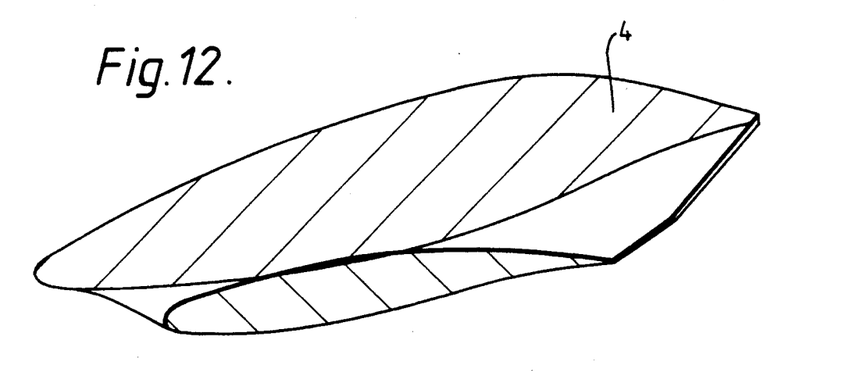
Figure 13:
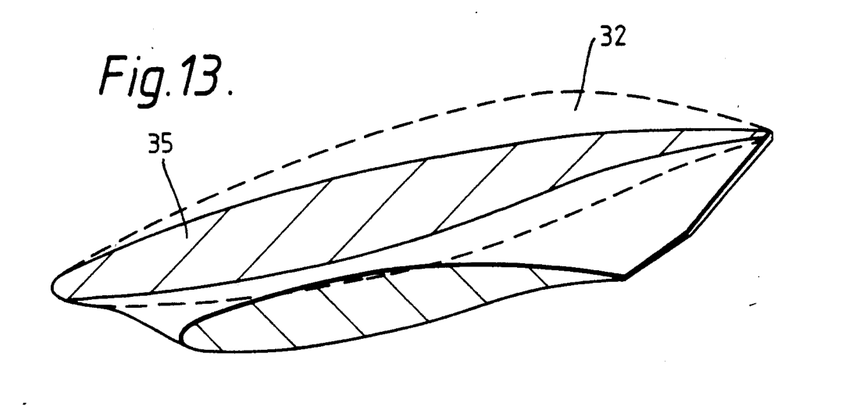

This inner wing geometry can be achieved by modifying the geometry of the wing root section 4 itself, as shown in FIG. 12, or by the addition of a wing/fuselage fairing, fillet or shaped body 32, as shown in FIG. 13, having the same general shape (and function) over a conventional wing root section design 35.

Other inner-wing shapes, slightly modified from that described above are possible in the light of the underlying design principle. It is primarily the concept of the control of the flow over the inner wing, particularly using the upper surface curvature to 'manipulate' the sweep of the isobars, and the three-dimensionality of the flow to alleviate the pressure recovery over the rear of the sections, which comprises the novelty of the invention. The detailed description of a specific example set forth above is by way of illustration only and is not to be taken as limiting on the invention.

We claim:

1. A swept forward wing for a transonic flight aircraft comprising an inner wing portion and an outer wing portion, said inner wing portion including a wing root section having a far aft maximum thickness position coupled with high camber in a region of said maximum thickness position, said wing root section further including a negatively cambered leading edge portion and a nose-down twist configured to suppress high leading edge velocities wherein the combination of thickness and camber forms aft of said leading edge region causes air flow to accelerate until a maximum velocity is reached aft of the 50 percent chord line on said wing and whereby steep recompression during transonic flight is alleviated by significant three dimensionality of the flow over said inner wing portion.

2. A swept forward wing according to claim 1 in which said inner wing portion includes at its intersection with said outer wing portion an aerofoil and said wing root section is extrapolated across the inner wing span to said aerofoil section and position and strength of the shock wave is controlled.

3. A swept forward wing according to claim 1 in which a leading edge has a fairly small radius of curvature blended rapidly into an upper surface leading edge region and a lower surface leading edge region, said lower surface leading edge region having a curvature larger than said upper surface leading edge region and having a considerable lower surface thickness, an upper surface region aft of said leading edge region having a large radius of surface curvature with curvature increasing towards a position of maximum wing thickness, a region aft of this maximum thickness position having a curvature gradually reducing towards a trailing edge of the wing.

4. A swept forward wing according to claim 3 in which said lower surface of said wing includes a reflexed region at the rear thereof.

* * * * *